(12) United States Patent
Harumoto et al.

(10) Patent No.: US 8,229,610 B2
(45) Date of Patent: Jul. 24, 2012

(54) DECELERATION-RUNNING EVALUATING DEVICE

(75) Inventors: Satoshi Harumoto, Hyogo (JP); Yuusaku Matsuda, Hyogo (JP); Kouei Kiyo, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 873 days.

(21) Appl. No.: 12/003,449

(22) Filed: Dec. 26, 2007

(65) Prior Publication Data

US 2008/0234876 A1 Sep. 25, 2008

(30) Foreign Application Priority Data

Dec. 27, 2006 (JP) .................................. 2006-353303

(51) Int. Cl.
*G06F 19/00* (2006.01)
*G06F 7/00* (2006.01)
*G06G 7/70* (2006.01)
*G01M 15/00* (2006.01)

(52) U.S. Cl. ........................................ 701/22; 701/110
(58) Field of Classification Search .................... 701/93, 701/22, 123, 114, 33, 102, 110, 101; 73/113, 73/114.52, 114.38
See application file for complete search history.

(56) References Cited

U.S. PATENT DOCUMENTS

| | | | | |
|---|---|---|---|---|
| 6,278,928 | B1 * | 8/2001 | Aruga et al. | 701/65 |
| 7,357,123 | B2 * | 4/2008 | Maekawa et al. | 123/490 |
| 7,454,962 | B2 * | 11/2008 | Nishiyama et al. | 73/114.52 |
| 7,490,000 | B2 * | 2/2009 | Siddiqui et al. | 701/104 |
| 2004/0230376 | A1 * | 11/2004 | Ichikawa et al. | 702/2 |
| 2005/0096836 | A1 * | 5/2005 | Minami et al. | 701/123 |
| 2007/0213920 | A1 * | 9/2007 | Igarashi et al. | 701/114 |
| 2007/0256481 | A1 * | 11/2007 | Nishiyama et al. | 73/113 |
| 2008/0059035 | A1 * | 3/2008 | Siddiqui et al. | 701/93 |

FOREIGN PATENT DOCUMENTS

| | | |
|---|---|---|
| JP | A 2-9924 | 1/1990 |
| JP | A 8-290730 | 11/1996 |
| JP | A 11-220807 | 8/1999 |
| JP | A 2002-46498 | 2/2002 |
| JP | A 2004-240873 | 8/2004 |
| JP | A 2005-337229 | 12/2005 |
| JP | A 2006-57483 | 3/2006 |

* cited by examiner

*Primary Examiner* — Ronnie Mancho
(74) *Attorney, Agent, or Firm* — Oliff & Berridge, PLC

(57) ABSTRACT

A total distance calculating unit calculates a total running distance and an energy-cut-off distance calculating unit calculates a deceleration running distance of a vehicle. The deceleration running distance is a distance for which the vehicle runs while the vehicle is in a deacceleration state and no energy is supplied to a motor of the vehicle. A deceleration-running evaluating unit evaluates deceleration running of the vehicle based on a ratio of the deceleration running distance to the total running distance. The result of the evaluation is displayed for the driver of the vehicle.

8 Claims, 6 Drawing Sheets

US 8,229,610 B2

DECELERATION-RUNNING EVALUATING DEVICE

BACKGROUND OF THE INVENTION

1. Field of the Invention

The present invention relates to a technology for evaluating deceleration running of a vehicle.

2. Description of the Related Art

Drivers repeatedly switch between acceleration and deceleration during running of vehicles. Even when vehicles run at a substantially constant speed, the constant speed is maintained by repeating acceleration and deceleration of the vehicle in a technical sense.

When vehicles decelerate during running, it is not necessary to supply driving force to the vehicles. If the driving force to the vehicles is cut off by cutting the energy supply to engines, it is possible to save the energy consumption of the vehicles. A conventional technology for performing energy saving control to reduce energy consumption in a deceleration state of vehicles is disclosed in, for example, Japanese Patent Application Laid-open No. H08-290130.

In the conventional technology, it is possible to perform control to reduce energy consumption; however, the conventional technology does not provide a benchmark indicating how much energy saving has been achieved. Therefore, drivers have no chance to know how much energy consumption reduction they have achieved due to their driving style including current acceleration and deceleration of their vehicles. Consequently, the drivers are not able to make efforts to change their driving style to achieve further energy consumption reduction.

SUMMARY OF THE INVENTION

It is an object of the present invention to at least partially solve the problems in the conventional technology.

According to an aspect of the present invention, there is provided an apparatus that evaluates a deceleration running of a vehicle, the deceleration running is a deacceleration state of the vehicle having an energy cut-off mechanism that cuts off energy supply to a motor of the vehicle during the deceleration running. The apparatus includes a first calculating unit that calculates a first running distance of the vehicle during a predetermined period; a detecting unit that detects an energy cut-off state in which the energy cut-off mechanism cuts-off energy supply to the motor; a second calculating unit that calculates a second running distance of the vehicle, the second distance is a distance traveled by the vehicle while the vehicle is in the energy cut-off state during the predetermined period; an evaluating unit that evaluates the deceleration running of the vehicle based on the first running distance and the second running distance; and a notifying unit that notifies a result of evaluation obtained by the evaluating unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A "vehicle" in the following explanation can be a vehicle driven by internal combustion engine using fossil fuel (e.g., gasoline and light oil refined from crude oil, or coal) and explosive air (e.g., hydrogen), an electric vehicle driven by an electric motor, or a hybrid vehicle driven by an internal combustion engine and/or an electric motor depending on situation.

For driving vehicles by internal combustion engine, it is necessary to feed fuel to the internal combustion engine. Similarly, for driving electric vehicles or hybrid vehicles by electric motors, it is necessary to feed electric energy to the electric motors.

In the vehicles considered in the following embodiments, no fuel or energy is supplied to the motors if the vehicles are in deceleration running state. If the vehicles run without supplying fuel or energy to motors, it is possible to save fuel or energy. In this document, such state of running is described as "free run". It is possible to save more fuel or energy by doing efforts to increasing the running distance during free run.

A first embodiment of the present invention is described with reference to FIGS. 1 to 3. In the first embodiment, ratio of a running distance during free run to a total running distance of a vehicle from a first predetermined time to a second predetermined time is calculated and notified to the driver. Examples of the first predetermined time include a time of reception of reset operation, turning ON of an ignition key of the vehicle, and start of running of the vehicle. Similarly, examples of the second predetermined time include time of re-reception of reset operation, turning OFF of an ignition key of the vehicle, and end of running of the vehicle.

Figure 1:
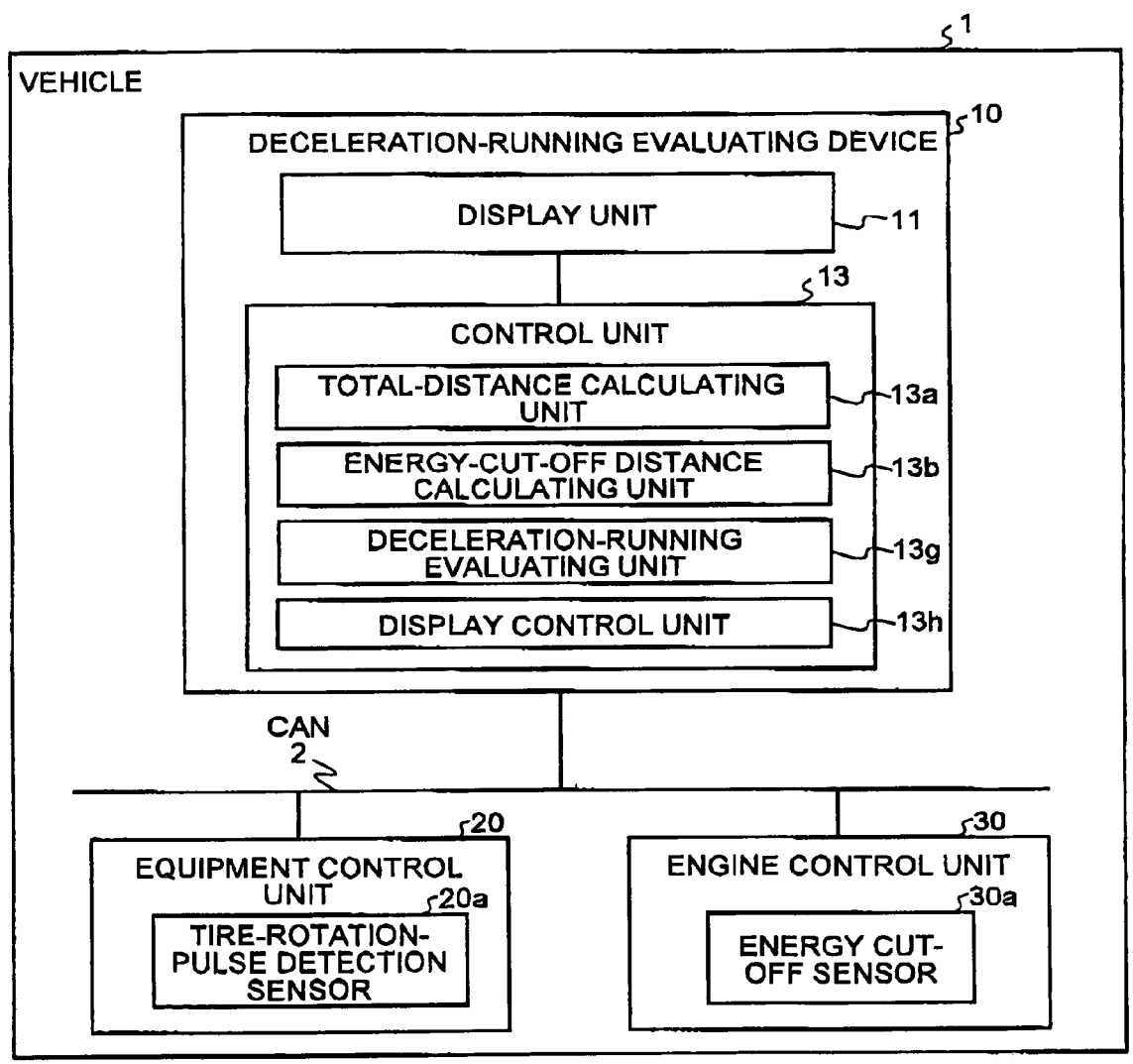
FIG. 1 is a functional block diagram of a deceleration-running evaluating device, which is installed in a vehicle, according to a first embodiment of the present invention.

FIG. 1 is a functional block diagram of a deceleration-running evaluating device 10, which is installed in a vehicle 1, according to the first embodiment. The vehicle 1 includes, apart from the deceleration-running evaluating device 10, an equipment control unit 20, and an engine control unit 30. The deceleration-running evaluating device 10, the equipment control unit 20, and the engine control unit 30 are communicably connected to each other through a controller area network (CAN) 2 serving as an on-vehicle network. The equipment control unit 20 controls on-vehicle electronics (not shown). The engine control unit 30 electronically controls an engine (not shown) of the vehicle 1.

The deceleration-running evaluating device 10 includes a display unit 11 and a control unit 13. The display unit 11 displays data, and the control unit 13 controls the deceleration-running evaluating device 10.

The control unit 13 includes a total-distance calculating unit 13a, an energy-cut-off distance calculating unit 13b, a deceleration-running evaluating unit 13g, and a display control unit 13h.

The total-distance calculating unit 13a, from a time point at which the first predetermined time begins, accumulates and counts the number of pulses detected with respect to each rotation of tires (the total number of pulses) acquired from a tire-rotation-pulse detection sensor 20a in the equipment control unit 20. The total-distance calculating unit 13a then calculates total running distance (meters) by multiplying the total number of pulses by a circumferential length of a tire.

The energy-cut-off distance calculating unit 13b, from a time point at which the first predetermined time begins, accumulates and counts the number of pulses detected with respect to each rotation of tires (the number of energy-cut-off pulses) acquired from the tire-rotation-pulse detection sensor 20a while a signal indicative of energy cut-off is detected by an energy cut-off sensor 30a in the energy control unit 30. The energy-cut-off distance calculating unit 13b then calculates an energy-cut-off running distance (meters) by multiplying the number of energy-cut-off pulses by circumferential length of a tire. The total number of pulses, the number of energy-cut-off pulses, the total running distance, and the energy-cut-off running distance are stored in a storage unit (not shown) of the control unit 13.

The deceleration-running evaluating unit 13g compares the total running distance with the energy-cut-off running distance, and evaluates deceleration running of the vehicle 1 based on the comparison. Specifically, the deceleration-running evaluating unit 13g calculates a first ratio $r_1$ between the total running distance and the energy-cut-off running distance, i.e., $r_1$=(energy-cut-off running distance/total running distance)×100(%), and sends the calculated ratio $r_1$ to the display control unit 13h. The display control unit 13h displays the ratio r1 on the display unit 11. In other words, the percentage of the energy-cut-off running distance in the total running distance is notified to the driver so that the driver can evaluate the deceleration running of the vehicle 1 and if required change his driving style.

Instead of displaying the ratio r1, it is possible to evaluate the ratio r1 and display the result of the evaluation on the display unit 11 as the evaluation of the deceleration running of the vehicle 1. For example, it is possible to evaluate deceleration running in the following manner: deceleration running is ranked as "A" if $40 < r_1$; "B" if $30 \leq r_1 < 40$; "C" if $20 \leq r_1 < 30$; and "D" if $r_1 < 20$.

The equipment control unit 20 includes the tire-rotation-pulse detection sensor 20a. The tire-rotation-pulse detection sensor 20a outputs a pulse for every complete rotation of the tires (not shown) of the vehicle 1. In other words, if the tire rotates 100 times, the tire-rotation-pulse detection sensor 20a outputs 100 pulses.

The engine control unit 30 electronically controls the engine of the vehicle 1. The engine control unit 30 includes the energy cut-off sensor 30a that detects an energy cut-off state in which energy supply to an engine is cut off.

Figure 2:
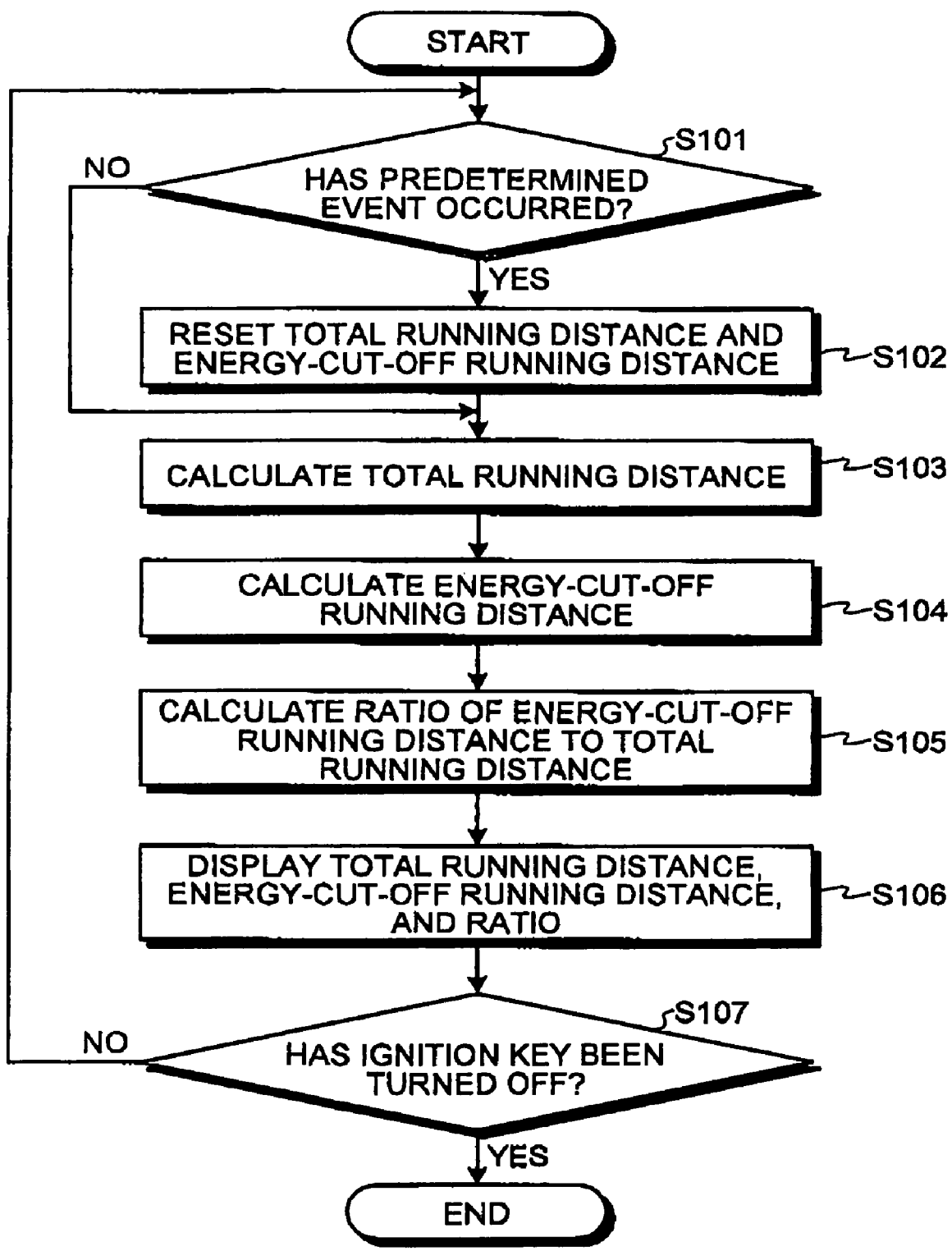
FIG. 2 is a flowchart of a process of evaluating deceleration running performed by the deceleration-running evaluating device shown in FIG. 1.

FIG. 2 is a flowchart of a process of evaluating deceleration running performed by the deceleration-running evaluating device 10. The control unit 13 determines whether a predetermined event (e.g., a time of reception of reset operation, turning ON of an ignition key of the vehicle, and start of running of the vehicle) has occurred (step S101). If the predetermined event has occurred (Yes at step S101), the control unit 13 resets the total running distance and the energy-cut-off running distance (step S102). If the predetermined event has not occurred (No at step S101), process control proceeds to step S103.

The total-distance calculating unit 13a calculates the total running distance by multiplying the total number of pulses, which are counted from the occurrence of the predetermined event (first predetermined time) to the current time (second predetermined time), by the circumferential length of a tire (step S103). The energy-cut-off distance calculating unit 13b calculates the energy-cut-off distance by multiplying the number of energy-cut-off pulses of rotation of tires counted while the energy cut-off sensor 30a detects the energy cut-off state by a circumferential length of a tire from the occurrence of the predetermined event to the current time (step S104).

The deceleration-running evaluating unit 13g calculates the ratio of the energy-cut-off distance calculated at step S104 to the total running distance calculated at step S103 (step S105). The display control unit 13h displays the total running distance, the energy-cut-off running distance, and the ratio calculated at step S105 on the display unit 11 (step S106). The control unit 13 determines whether the ignition key has been turned OFF (step S107). When the ignition key has been turned OFF (Yes at step S107), process control ends. When the ignition key has not been turned OFF (No at step S107), process control returns to step S101.

Figure 3:
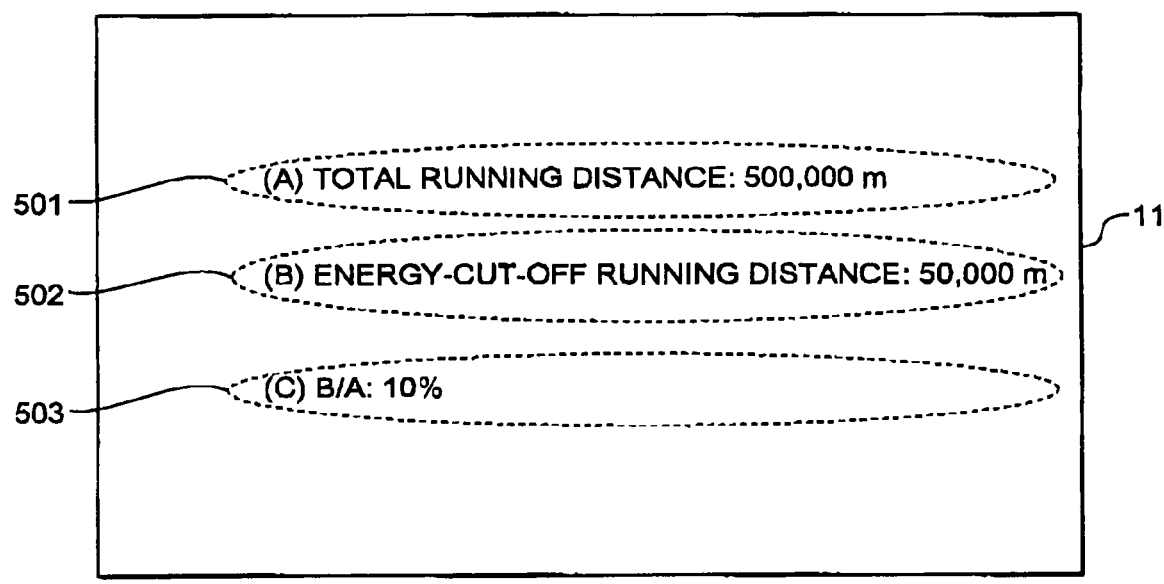
FIG. 3 is an example of display of a result of evaluation of deceleration running on a display unit shown in FIG. 1.

FIG. 3 is an example of display of data on the display unit 11. The display control unit 13h causes the display unit 11 to display (A) the total running distance calculated by the total-distance calculating unit 13a on a display area 501, (B) the energy-cut-off running distance calculated by the energy-cut-off distance calculating unit 13b on a display area 502, and (C) the ratio calculated by the deceleration-running evaluating unit 13g on a display area 503.

It is possible to update data displayed on the display area 501 every time the total running distance is updated by the total-distance calculating unit 13a. Data displayed on the display area 502 can be updated every time the energy-cut-off distance calculating unit 13b calculates the energy-cut-off running distance after the control unit 13 detects deceleration of the vehicle 1. Similarly, data displayed on the display area 503 can be updated every time the deceleration-running evaluating unit 13g calculates the ratio after detection of deceleration of the vehicle 1.

Thus, the total running distance, the energy-cut-off running distance, and the ratio of the energy-cut-off running distance to the total running distance are displayed on a display unit for the driver or the like. Therefore, it is possible to notify a ratio of a running distance during free run to the total running distance to a driver. This ratio can be used as a benchmark to evaluate energy-saving driving. Thus, the driver can grasp the ratio of the energy-cut-off running distance to the total running distance displayed on the display unit. In addition, the driver can evaluate his driving style from the displayed ratio, and can change his driving style so as to further increase the value of the ratio thereby further reducing the energy consumption.

A second embodiment of the present invention is described with reference to FIGS. 4 to 6. In the second embodiment, ratio of a deceleration-running distance while a vehicle is in a deceleration state to an ideal deceleration-running distance while a vehicle is running at an ideal deceleration speed for energy saving from a first predetermined time to a second predetermined time is calculated and notified to the driver. Examples of the first predetermined time include a time of reception of reset operation, turning ON of an ignition key of the vehicle, and start of running of the vehicle. Similarly, examples of the second predetermined time include time of re-reception of reset operation, turning OFF of an ignition key of the vehicle, and end of running of the vehicle.

Figure 4:
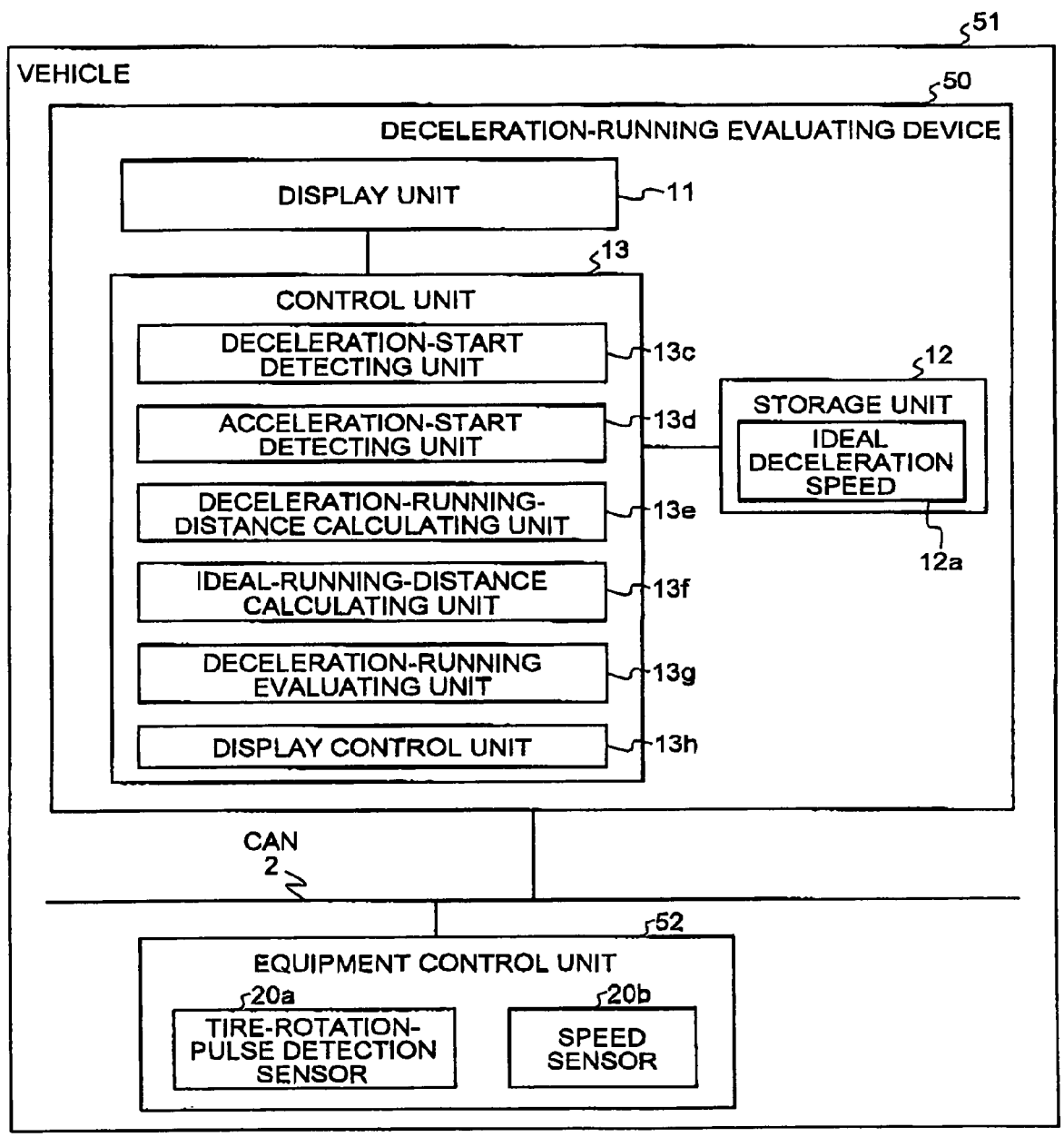
FIG. 4 is a functional block diagram of a deceleration-running evaluating device, which is installed in a vehicle, according to a second embodiment of the present invention.

FIG. 4 is a functional block diagram of a deceleration-running evaluating device 50, which is installed in a vehicle 51, according to the second embodiment. The vehicle 51 includes, apart from the deceleration-running evaluating device 50, an equipment control unit 52. The deceleration-running evaluating device 50 and the equipment control unit 52 are communicably connected to each other via the CAN 2 serving as an on-vehicle network. The equipment control unit 52 controls on-vehicle electronics (not shown).

The deceleration-running evaluating device 50 includes the display unit 11, a storage unit 12, and the control unit 13. The display unit 11 displays data; the storage unit 12 stores therein data; and the control unit 13 controls the deceleration-running evaluating device 50.

The control unit 13 includes a deceleration-start detecting unit 13c, an acceleration-start detecting unit 13d, a deceleration-running-distance calculating unit 13e, an ideal-running-distance calculating unit 13f, the deceleration-running evaluating unit 13g, and the display control unit 13h.

The deceleration-start detecting unit 13c detects deceleration of the vehicle 51 based on a running speed of the vehicle 51 acquired by a speed sensor 20b in the equipment control unit 52. The acceleration-start detecting unit 13d detects acceleration of the vehicle 51 based on a running speed of the vehicle 51 acquired by the speed sensor 20b.

The deceleration-running-distance calculating unit 13e, from a time point at which the first predetermined time begins, accumulates and counts the number of pulses detected with respect to each rotation of tires (the number of deceleration-pulses) acquired from the tire-rotation-pulse detection sensor 20a in the equipment control unit 52 during a period from detection of deceleration by the deceleration-start detecting unit 13c to detection of acceleration by the acceleration-start detecting unit 13d. The deceleration-running-distance calculating unit 13e then calculates an energy-cut-off running distance (meters) by multiplying the number of deceleration-pulses by a circumferential length of a tire.

The ideal-running-distance calculating unit 13f calculates an ideal deceleration-running distance (meters) when the vehicle 51 decelerates at an ideal deceleration speed for energy saving from start of detection of deceleration by the deceleration-start detecting unit 13c.

When an ideal deceleration speed 12a, i.e, $a_{ideal}$ (m/s²), which is stored in the storage unit 12, for energy saving is kept constant, a running speed v at a time T (v(T)) is obtained by Equation (1):

$$v(T) = v_0 - \int_{t_0}^{T} a_{ideal} dT \tag{1}$$

where $t_0$ is a time point at which the deceleration-start detecting unit 13c detects deceleration, and $v_0$ is a running speed at a time point $t_0$.

If it is assumed that the running speed v(T) is $v_1$ (m/s) at time $t_1$, $v(t_1)$ is calculated by Equation (2):

$$v(t_1) = v_1 = v_0 - \int_{t_0}^{t_1} a_{ideal} dT \tag{2}$$

From Equation (2), $t_1$ is represented by Equation (3):

$$t_1 = \frac{v_0 - v_t}{a_{ideal}} + t_0 \tag{3}$$

Thus, an ideal deceleration-running distance $L_{ideal}$ (meters) of the vehicle 51 at an ideal deceleration speed for energy saving is calculated by Equation (4):

$$\begin{aligned} L_{ideal} &= \int_{t_0}^{t_1} v(T) dT \\ &= v_0(t_1 - t_0) - \frac{a_{ideal}}{2}(t_1 - t_0)^2 \\ &= \frac{v_0^2 - v_1^2}{2 a_{ideal}} \end{aligned} \tag{4}$$

Thus, $L_{ideal}$ is calculated from the running speed $v_0$ (m/s) at which the deceleration-start detecting unit 13c detects deceleration, the running speed $v_1$ (m/s) at which the acceleration-start detecting unit 13d detects acceleration, and the ideal deceleration speed $a_{ideal}$ (m/s²) for energy saving.

The deceleration-running evaluating unit 13g evaluates deceleration running by comparing the deceleration running distance L (meters) calculated by the deceleration-running-distance calculating unit 13e with the ideal deceleration-running distance $L_{ideal}$ (meters) calculated by the ideal-running-distance calculating unit 13f. Specifically, the deceleration-running evaluating unit 13g calculates and notifies a ratio $r_2$ of the deceleration running distance L to the ideal deceleration-running distance $L_{ideal}$ by $r_2 = L/L_{ideal}$. In other words, the deceleration-running evaluating unit 13g evaluates deceleration running by calculating an achievement ratio indicating how much degree the deceleration running distance L has approached to the ideal deceleration-running distance $L_{ideal}$. The deceleration-running evaluating unit 13g then sends an evaluation result to the display control unit 13h. The display control unit 13h displays information indicative of the evaluation result received from the deceleration-running evaluating unit 13g on the display unit 11. It is possible to evaluate levels of $r_2$ in a similar manner described in connection with $r_1$ of the first embodiment.

The storage unit 12 stores therein the number of deceleration pulses and the deceleration running distance in addition to the ideal deceleration speed 12a.

The equipment control unit 52 includes the tire-rotation-pulse detection sensor 20a and the speed sensor 20b. The tire-rotation-pulse detection sensor 20a detects every rotation of tires mounted on wheels, and outputs pulses with respect to each rotation. The speed sensor 20b detects a running speed of the vehicle 51 at a time of rotation by the tire-rotation-pulse detection sensor 20a.

Figure 5:
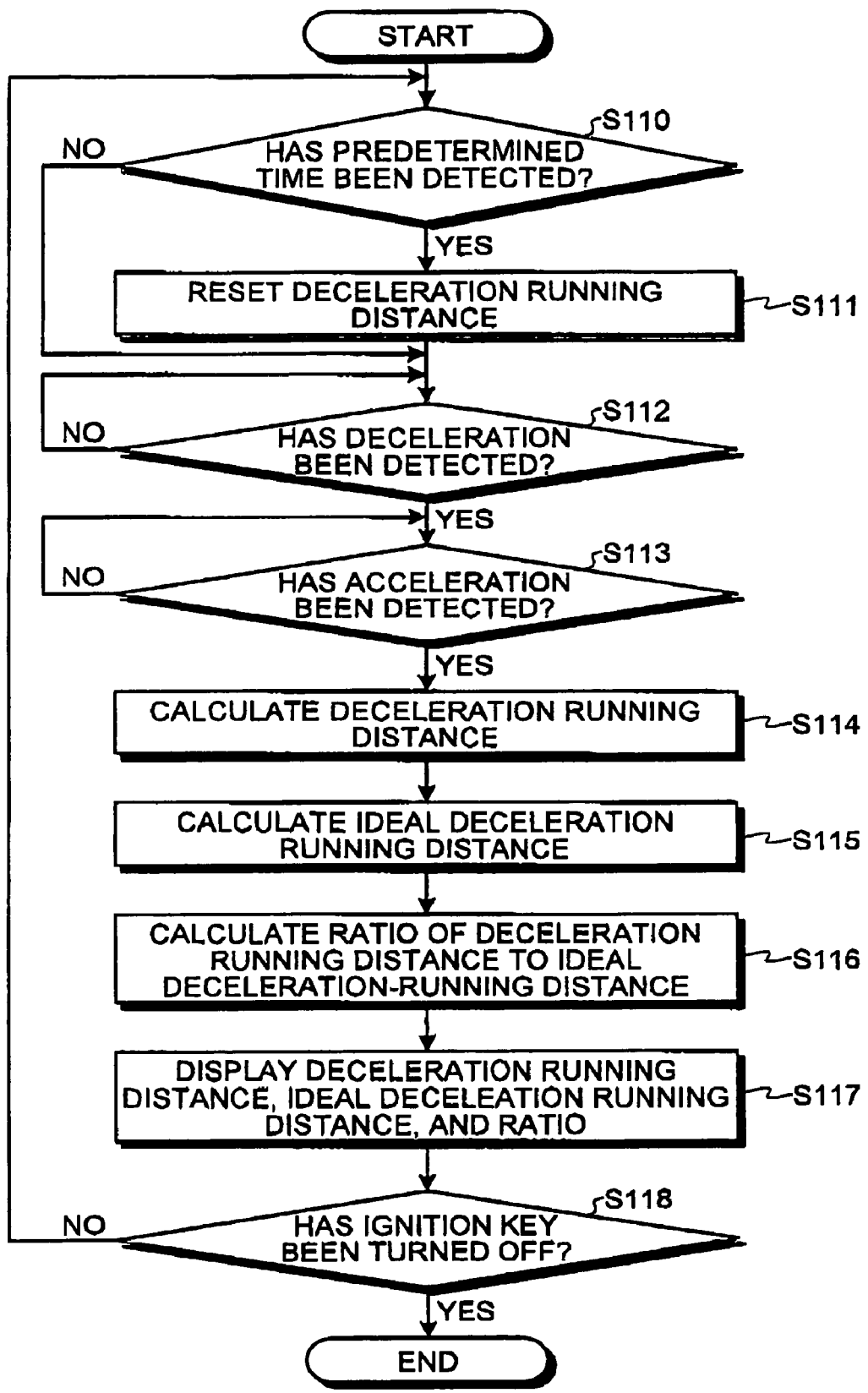
FIG. 5 is a flowchart of a process of evaluating deceleration running performed by the deceleration-running evaluating device shown in FIG. 4.

FIG. 5 is a flowchart of a process of evaluating deceleration running performed by the deceleration-running evaluating device 50. The control unit 13 determines whether a predetermined event (e.g., a time of reception of reset operation, turning ON of an ignition-key of the vehicle, and start of running of the vehicle) has occurred (step S110). If the predetermined event has occurred (Yes at step S110), the control unit resets a deceleration running distance (step S111). If the predetermined event has not occurred (No at step S110), process control proceeds to step S112.

The deceleration-start detecting unit 13c determines whether deceleration has been detected (step S112). When deceleration has been detected (Yes at step S112), the process control proceeds to step S113. When deceleration has not been detected (No at step S112), step S112 is repeated.

The acceleration-start detecting unit 13d determines whether acceleration has been detected (step S113). When acceleration has been detected (Yes at step S113), the process control proceeds to step S114. When acceleration has not been detected (No at step S113), step S113 is repeated.

The deceleration-running-distance calculating unit 13e calculates the deceleration running distance L (meters) by multiplying the number of deceleration pulses counted from detection of deceleration to detection of acceleration by a circumferential length of a tire (step S114). The ideal-running-distance calculating unit 13f calculates the ideal deceleration-running distance $L_{ideal}$ based on the running speed $v_0$ at a time of detection of deceleration, the running speed $v_1$ at a time of detection of acceleration, and the ideal deceleration speed $a_{ideal}$ (step S115).

Specifically, the ideal distance $L_{ideal}$ is calculated based on a distance point where the vehicle 51 runs at the running speed $v_1$. In other words, to reach $v_1$ from $v_0$ at an ideal deceleration speed, an ideal distance point where the vehicle 51 began to run at the running speed $v_0$ is calculated by relational expression between the running speed $v_1$ and an ideal deceleration speed based on a distance point where the vehicle 51 runs at the running speed $v_1$. The distance point where the vehicle 51 began to run at the running speed $v_0$ is a point where ideal deceleration has been started. The relational expression of the ideal deceleration speed is previously determined from experiments and analyses. Alternatively, it is possible to change the ideal deceleration speed depending on type of vehicles or environment (weather or state of roads) around vehicles.

The deceleration-running evaluating unit 13g calculates a ratio of the deceleration running distance L (meters) calculated at step S114 to the ideal deceleration-running distance $L_{ideal}$ (meters) calculated at step S115 (step S116). The display control unit 13h displays the deceleration running distance L (meters), the ideal deceleration-running distance $L_{ideal}$ (meters), and the ratio calculated at step S116 on the display unit 11 (step S117). The control unit 13 determines whether the ignition key has been turned OFF (step S118). When the ignition key has been turned OFF (Yes at step S118), the process control ends. When the ignition key has not been turned OFF (No at step S118), the process control returns to step S110.

Figure 6:
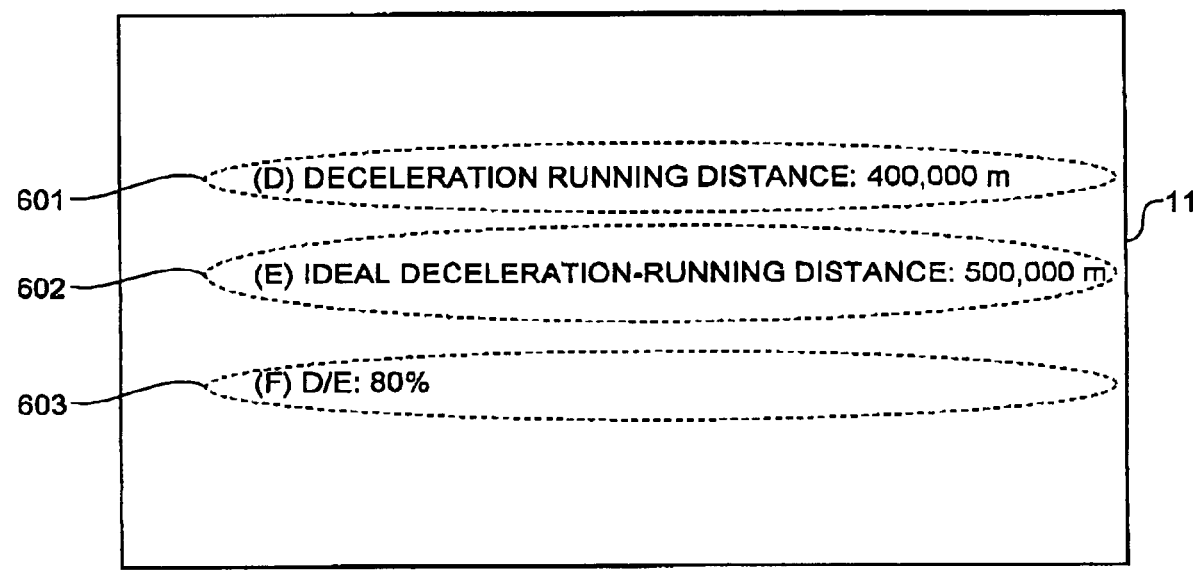
FIG. 6 is an example of display of a result of evaluation of deceleration running on a display unit shown in FIG. 4.

FIG. 6 is an example of display of a result of evaluation on the display unit 11. The display control unit 13h causes the display unit 11 to display (D) the deceleration running distance L (meters) on a display area 601, (E) the ideal deceleration-running distance $L_{ideal}$ (meters) on a display area 602, and (F) the ratio on a display area 603.

Data on the display area 601 is updated every time the deceleration running distance is calculated by the deceleration-running-distance calculating unit 13e after the control unit 13 detects the deceleration of the vehicle 51; data on the display area 602 is updated every time the ideal deceleration-running distance is calculated by the ideal-running-distance calculating unit 13f; and data on the display area 603 is updated every time the ratio is calculated by the deceleration-running evaluating unit 13g.

Thus, the deceleration running distance, the ideal deceleration-running distance, and the ratio of the deceleration running distance to the ideal deceleration-running distance are displayed on a display unit for the driver or the like. Therefore, it is possible to notify a ratio indicating how much degree the deceleration running distance has approached to the ideal deceleration-running distance. This ratio can be used as a benchmark to evaluate energy-saving driving. The driver can grasp the ratio indicating how much degree the deceleration running distance has approached to the ideal deceleration-running distance displayed on the display unit. In addition, the driver can evaluate his driving style from the displayed ratio, and can change his driving style so as to further increase the value of the ratio thereby further reducing the energy consumption.

The present invention is not limited to the first and the second embodiments described above. Any modification can be applicable within spirits and scope of the present invention.

For example, the energy cut-off sensor 30a is provided to detect the energy cut-off state. Alternatively, it is possible to provide an accelerator position sensor that detects a position of an accelerator (throttle) so as to detect a state in which energy supply to an engine is cut off based on a detected position of the accelerator and an engine speed.

Furthermore, the ideal deceleration speed $a_{ideal}$ (m\s$^2$) for energy saving is assumed to be constant; however, $a_{ideal}$ can be one that is obtained by function of the running speed v, i.e., $a_{ideal}=a_{ideal}(V)$ (m\s$^2$).

Moreover, the deceleration running distance, the ideal deceleration-running distance, and the ratio of the deceleration running distance to the ideal deceleration-running distance are calculated every time the control unit 13 detects deceleration of the vehicle 51 after a predetermined event (e.g., a time of reception of reset operation, turning ON of an ignition key of the vehicle, and start of running of the vehicle) has occurred. Alternatively, the deceleration-running-distance calculating unit 13e can calculate an accumulated deceleration running distance, the ideal-running-distance calculating unit 13f can calculate an accumulated ideal deceleration-running distance, and the deceleration-running evaluating unit 13g can calculate ratio of the accumulated deceleration running distance to the accumulated ideal deceleration-running distance every time the control unit 13 detects deceleration of the vehicle 51.

Each of Equations (1) to (4) is an example of calculation and assumption for obtaining various values and benchmarks. Other Equations can be used to achieve the same effects.

Of the various types of processing explained in the description of the above embodiments, it is acceptable to manually perform a part or all of the processing that is explained to be performed automatically. Conversely, it is acceptable to automatically perform, using known techniques, a part or all of the processing that is explained to be performed manually. In addition, the processing procedures, the controlling procedures, the specific names, and the information including various types of data and parameters that are presented in the text and the drawings can be modified in any form, except when it is noted otherwise.

The constituent elements shown in the drawings are based on functional concepts. The constituent elements do not necessarily have to be physically arranged in the way shown in the drawings. In other words, the specific mode in which the constituent elements are distributed and integrated is not limited to the ones shown in the drawing. A part or all of the apparatuses can be distributed or integrated, either functionally or physically in any arbitrary units according to various loads and use condition.

A part or all of the processing functions offered by the constituent elements can be realized by a central processing unit (CPU), a micro processor unit (MPU), a micro computer such as a micro controller unit (MCU), and a program analyzed and executed by the CPU, or can be realized as hardware with wired logic.

According to an aspect of the present invention, it is possible to notify a running distance in an energy cut-off state and a ratio of the running distance to the total running distance. Therefore, it is possible to notify how much degree a cycle of acceleration and deceleration during driving contributes to saving of energy consumption. In other words, it is possible to give information or numeric data for improving a cycle of acceleration and deceleration of a vehicle to save more energy consumption. Thus, it is possible to reduce pollution due to energy consumption.

Furthermore, the deceleration running distance is compared with the ideal deceleration-running distance. Therefore, the deceleration running can be evaluated by using objective target value. Thus, it is possible to notify data for improving a cycle of acceleration and deceleration of a vehicle so that deceleration running distance approaches to the ideal distance to save energy consumption.

Moreover, it is possible to notify a ratio of the deceleration running distance to the ideal deceleration-running distance. Therefore, it is possible to clearly notify numeric data indicating how much degree a cycle of acceleration and deceleration during a driving contributes to saving of energy consumption. In other words, it is possible to notify numeric data for improving a cycle of acceleration and deceleration so that the deceleration running distance approaches to the ideal deceleration-running distance to improve energy saving.

Furthermore, a result of evaluation of deceleration running is visually displayed so that a driver can view the result without disturbing his/her driving. Thus, it is possible to easily and assuredly notify data to a driver even when the driver cannot turn his/her face from a driving direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus that evaluates a deceleration running of a vehicle, the deceleration running being a deceleration state of the vehicle having an energy cut-off mechanism that cuts off energy supply to a motor of the vehicle during the deceleration running, the apparatus comprising:
   a first calculating unit that calculates a first running distance, the first running distance being a distance run by the vehicle while the vehicle is in the deceleration state during a predetermined period, the predetermined period being from a time when a start of the deceleration state of the vehicle is detected to a time when a start of an acceleration state of the vehicle is detected;
   a second calculating unit that calculates a second running distance, the second running distance being an ideal distance run by the vehicle when the vehicle decelerates at a predetermined ideal deceleration for energy saving while the vehicle is in the deceleration state during the predetermined period, the second running distance is calculated based on:
   a running speed of the vehicle at the time when the start of the deceleration state of the vehicle is detected;
   a running speed of the vehicle at the time when the start of an acceleration state of the vehicle is detected; and
   the predetermined ideal deceleration for energy saving;
   an evaluating unit that evaluates the deceleration running of the vehicle based on the first running distance and the second running distance; and
   a notifying unit that notifies a result of evaluation obtained by the evaluating unit.

2. The apparatus according to claim 1, further comprising:
   a third calculating unit that calculates a third running distance of the vehicle during the predetermined period;
   a detecting unit that detects an energy cut-off state in which the energy cut-off mechanism cuts-off energy supply to the motor; and
   a fourth calculating unit that calculates a fourth running distance of the vehicle, the fourth running distance being a distance traveled by the vehicle while the vehicle is in the energy cut-off state during the predetermined period, wherein
   the evaluating unit evaluates deceleration running of the vehicle based on the third running distance and the fourth running distance.

3. The apparatus according to claim 2, wherein the evaluating unit evaluates deceleration running of the vehicle based on a ratio of the fourth running distance to the third running distance.

4. The apparatus according to claim 1, wherein the evaluating unit evaluates deceleration running of the vehicle based on a ratio of the first running distance to the second running distance.

5. The apparatus according to claim 1, wherein the notifying unit includes a display unit that displays the result of evaluation.

6. The apparatus according to claim 1, wherein the second running distance is a distance run by the vehicle while decelerating at the ideal deceleration between a first running speed and a second running speed.

7. The apparatus according to claim 6, wherein the predetermined ideal deceleration is based on characteristics of the vehicle.

8. The apparatus according to claim 1, further comprising:
   a tire-rotation-pulse detection sensor for detecting rotation of a tire, wherein the first running distance is calculated based on:
   a number of pulses detected by the tire-rotation-pulse detection sensor, and
   a circumferential length of the tire.

* * * * *